INVENTOR.
NORMAN G. KELLN
BY Eugene M. Whitacre
ATTORNEY

April 6, 1965 N. G. KELLN 3,177,432

MULTIFUNCTION AXIALLY MOVABLE KNOB CONTROL FOR CHANNEL SELECTION, FINE TUNING AND VOLUME CONTROL

Filed April 25, 1962

3 Sheets-Sheet 2

INVENTOR.

NORMAN G. KELLN

BY Eugene M. Whitacre

ATTORNEY

April 6, 1965 N. G. KELLN 3,177,432

MULTIFUNCTION AXIALLY MOVABLE KNOB CONTROL FOR CHANNEL SELECTION, FINE TUNING AND VOLUME CONTROL

Filed April 25, 1962 3 Sheets-Sheet 3

INVENTOR.
NORMAN G. KELLN
BY Eugene M. Whitacre
ATTORNEY

United States Patent Office 3,177,432

Patented Apr. 6, 1965

3,177,432

MULTIFUNCTION AXIALLY MOVABLE KNOB CONTROL FOR CHANNEL SELECTION, FINE TUNING AND VOLUME CONTROL

Norman G. Keiln, Indianapolis, Ind., assignor to Radio Corporation of America, a corporation of Delaware Filed Apr. 25, 1962, Ser. No. 190,172
6 Claims. (Cl. 325—457)

This invention relates to control mechanism for radio signal receivers such as television receivers, and more particularly to mechanisms for either manual or remote control of receiver volume, tuning and the like.

It is an object of this invention to provide an improved control mechanism for radio signal receivers such as television receivers which enables control of a plurality of receiver functions using only a single manually operable control element.

It is a further object of this invention to provide an improved control mechanism for television receivers of the type including a motor driven tuner, in which the control of tuning, fine tuning, volume control and receiver on-off is affected by the use of only a single "front panel" control means, and if desired, the same control means may be used to "program" or preset the tuner motor drive circuit so that the tuner will be set to stop in sequence at only certain desired channel selecting positions.

A tuning control mechanism in accordance with the invention includes a rotatable shaft which is axially movable in both directions from a reference position to which it is spring biased. The shaft is positioned to extend from the receiver cabinet, and is adapted to have a suitable control knob mounted thereon. A first gear means which is mounted on the shaft, meshes with a second gear when the shaft is in its reference or normal axial position. The second gear controls a volume control potentiometer, and, in one position of rotation, such as near a limit position of a potentiometer, rotation of the second gear causes an on-off switch to be actuated. Thus by rotation of the control knob when the shaft is in its reference axial position, the receiver volume and power on-off functions may be controlled.

The receiver is provided with a motor driven step-by-step tuner. To tune the receiver, the control knob is momentarily displaced to move the shaft axially on one direction, such as inwardly. This action causes the shaft to engage and close a switch in the turner driver motor circuit so that power is applied to the motor. The tuner driver motor circuit may be of any suitable type to keep the motor energized until the tuner has been driven to the next channel selecting position.

The receiver is also provided with a suitable pre-set fine tuning mechanism the purpose of which is to permit the fine tuning at each channel selecting position to be pre-set for optimum signal reception. One type of pre-set fine tuning mechanism which may be used in apparatus embodying the invention includes a carrier or disc member mounted on the main channel selector shaft of the tuner. A plurality of pinions, one for each channel, are mounted in spaced relation about the periphery of the carrier so that the pinions sequentially engage a mechanical linkage coupled to the receiver fine tuning reactance element. The pinion which engages the mechanical linkage is positioned to mesh with the first gear means when the control knob is displaced in a second axial direction. Thus to pre-set the fine tuning for a selected channel, the control knob is displaced, as by pulling it outwardly to cause the first gear means to disengage from the second (volume controlling) gear, and to engage with the pinion that is in contact with the mechanical linkage to the fine tuning control reactance means.

In some locations, only a few stations or channels may be received, and it is often desirable to program the tuner drive motor to automatically bypass the channel positions where no signals are received. This may be done by coupling the aforementioned switch in the tuner drive motor, or a switch in parallel therewith, to the mechanical linkage to the fine tuning reactance element. By presetting a peripherally mounted pinion to a limit position, the mechanical linkage when coupled to that pinion is moved to cause the tuner drive motor switch to be closed and thus energize the motor, so that the channel position corresponding to that particular pinion will be bypassed. Thus the receiver tuning may be programmed to bypass a given channel by pulling out on the control knob at that channel selecting position of the tuner, and adjusting the engaged pinion to a limit position.

As described, a control mechanism in accordance with one embodiment of the invention permits station or channel selection by momentarily pushing in on the control knob; fine tuning controlling and tuner drive motor programming by pulling out and rotating the control knob; and control of the receiver on-off and volume by rotation of the control knob in the reference axial position of its shaft.

A feature of the invention comprises an improved control knob assembly which minimizes the danger of accidentally pressing in on the knob or actuating the tuning motor drive circuit while adjusting the receiver volume and on-off controls. The knob assembly comprises two concentric portions adapted to rotate together but relatively movable in an axial direction. The outer movable portion is mounted to be close to the receiver cabinet wall so that it cannot move the shaft axially inwardly a sufficient distance to cause the tuner drive motor switch to close. The inner knob portion is spring biased relative to the outer movable portion so that the inner knob portion may be engaged by a finger tip to move the shaft in far enough to actuate the tuner drive control switch. Since the inner knob portion is substantially enclosed within the outer knob portion, and since the outer knob portion cannot be moved axially inwardly, there is substantially no danger of accidentally actuating the tuning function when the operator of the set desires to adjust the receiver volume or turn the receiver off.

The novel features which are considered to be characteristic of this invention are set forth with particularity in the appended claims. The invention itself, however, both as to its organization and method of operation, will best be understood from the following description when read in connection with the accompanying drawing in which:

Figure 1:
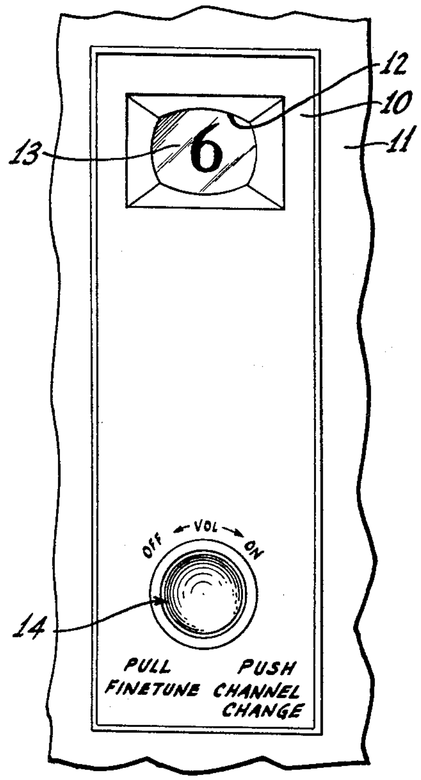
FIGURE 1 is a fragmentary view of a portion of a front panel of a television receiver showing a multifunction control knob and a tuning dial indicator.

Referring to the drawings, FIGURE 1 shows a fragmentary view of the front panel of the television receiver. An escutcheon plate 10 on the front panel 11 of a television receiver cabinet includes an aperture 12, behind which is a dial 13 indicating the channel to which the receiver is tuned. A control knob assembly 14 is mounted on a shaft 15 (FIGURE 2) which extends through the escutcheon plate 10. As indicated in FIGURE 1, the knob assembly 14 may be rotated counterclockwise to turn the receiver off, or rotated clockwise to turn the receiver on and set the volume level. In addition, the center portion knob assembly 14 may be pushed in to effect tuning or changing of television channels, and the outer portion pulled out to pre-set the fine tuning at each channel selecting position as indicated by the dial 13. As will be explained hereinafter, the knob assembly 14 may also be used to program the tuner drive motor circuit to stop at only certain desired channel selecting positions of the tuner which may correspond to those stations which can be received at the location of the television set.

Figure 3:
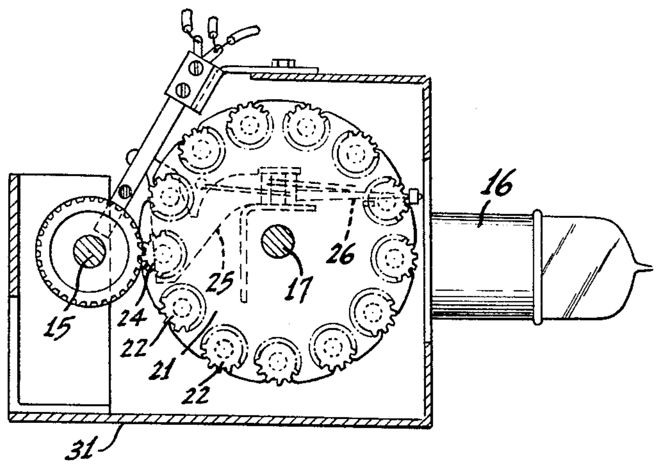
FIGURE 3 is a sectional view taken on the section lines 3—3 of FIGURE 2.
Figure 2:
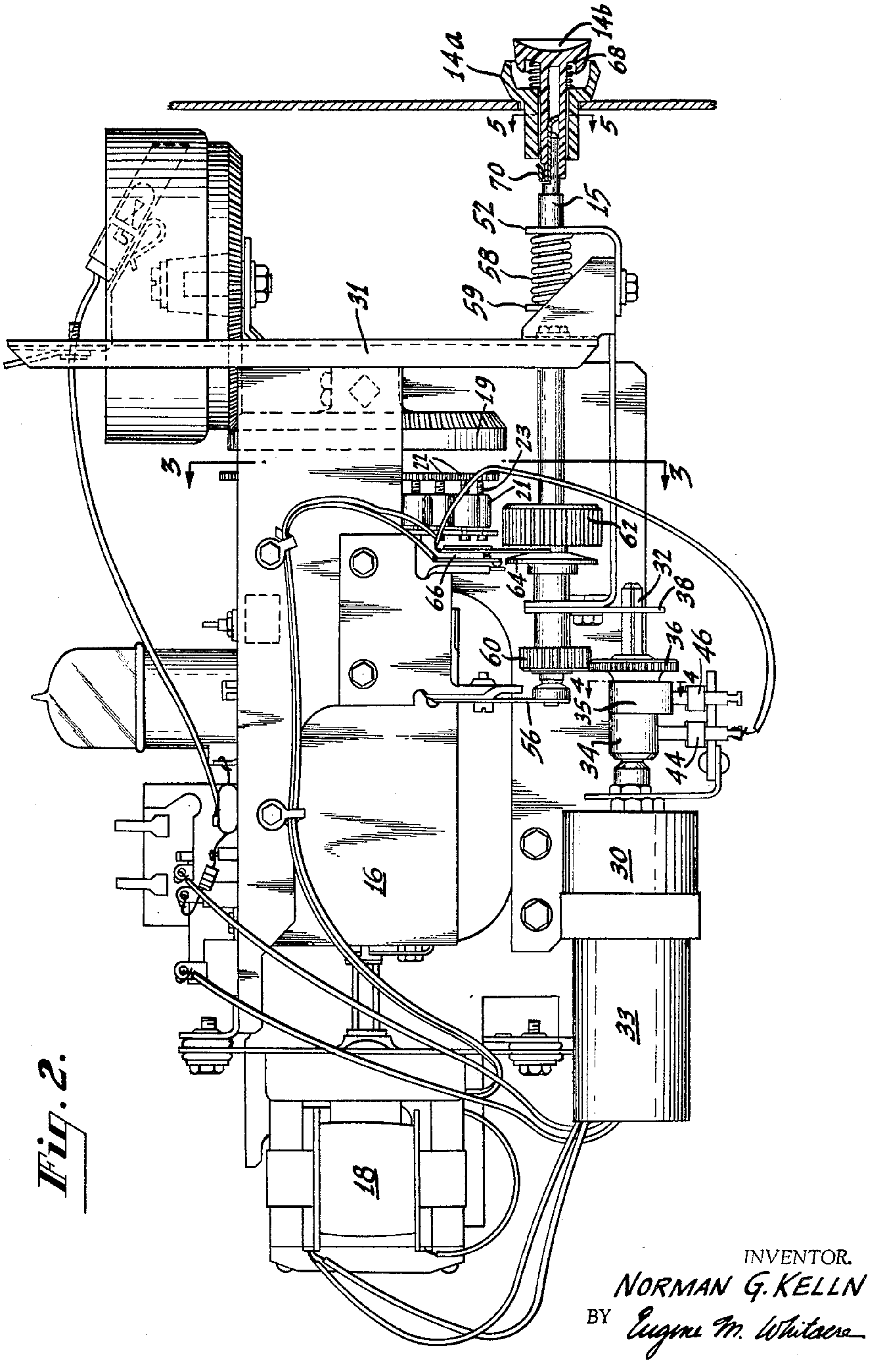
FIGURE 2 is a side view of a television tuner and volume controlling mechanism embodying the invention.

FIGURES 2 and 3 are side and front views respectively of a television tuner and volume control assembly including the control mechanism actuated by the knob assembly 14. The television tuner 16 is of any suitable type, and includes a rotatable shaft 17 which is driven by a tuner drive motor 18. The tuner includes a detent mechanism, not shown, for positively stopping the tuner sequentially at each of the twelve VHF channel selecting stations, and, if desired, at a thirteeenth position for the reception of UHF television signals. A bevel gear 19 is affixed to the front end of the tuner control shaft 17 to drive a second gear which is shown as an integral part of the tuning indicator dial 13.

Also mounted on the tuner control shaft 17 between the bevel gear 19 and the front of the tuner chassis is a carrier disc 21 which forms a part of the tuner pre-set fine tuning mechanism. A plurality of fine tuning control pinions 22 are mounted in spaced relation about the periphery of the disc 21. In the present instance there is one gear for each of the detent positions of the tuner.

Each of the fine tuning control pinions 22 is mounted on a screw 23 which projects inwardly toward one end 24 of a pivotally mounted fine tuning control lever 25, the other end 26 of the lever 25 controls a fine tuning reactance element, not shown. The fine tuning control 25 is spring biased so that the end 24 thereof is urged away from the tuner chassis toward the projecting ends of the screws 23 of the fine tuning control pinions 22.

As the tuner control shaft 17 is rotated from one channel to the next, the carrier disc 21 is rotated to bring one of the projecting screws 23 after another into contact with the end 24 of the fine tuning control lever 25. Only one of the projecting screws 23 engages the fine tuning control lever 25 at any given channel selecting position of the tuner shaft 17.

Thus by rotating the fine tuning control pinion 22 whose screw 23 is in engagement with the fine tuning control lever 25, the projecting end of the screw 23 is axially displaced and causes the lever 25 to pivot and thereby adjust the setting of the fine tuning reactance. In this manner, the fine tuning of the selected channel may be optimized and will be returned to the optimized setting each time the tuner is returned to that given channel position without further adjustment of the pinion 22.

A volume controlling potentiometer 30 which is mounted on a main supporting frame 31 for the tuner includes a shaft 32 which extends in both directions from the potentiometer 30. On one side of the potentiometer 30 the shaft 32 is coupled to a volume control drive motor 33 which is provided for remote control purposes to be described. On the other side of the volume controlling potentiometer 30, the shaft 32 supports a pair of cam members 34 and 35, which may if desired, be integrally formed as a single unit. The shaft 32 also supports a drive gear 36. The free end of the shaft 32 is rotatably journalled in a bracket 38 supported on the main supporting frame 31.

The cam members 34 and 35 which are shown in greater detail in FIGURE 4 include a pair of lobes 40 and 42 which sequentially engage the standby-off switch 44 and the master-off switch 46, the functions of which will be hereinafter explained. When the volume controlling potentiometer 30 is rotated to its clockwise (as viewed from the front of the receiver) limit position, the master off switch 46 is engaged by the lobe 42 of the cam 35 to cause that switch to open. Rotation of the volume controlling potentiometer counterclockwise from this position causes the lobe 40 of the cam 34 to engage and open the standby-off switch 44 and at the same time the lobe 42 releases the switch 46 permitting it to close. Further clockwise rotation of the volume controlling potentiometer causes the lobe 40 to release the switch 44 so that power is supplied to the receiver. The potentiometer 30 is designed so that the rotation of its variable contact is over an electrically dead portion of the potentiometer for those positions where the cam lobes engage the switches 44 and 46.

The knob assembly 14 on the front panel of the receiver is mounted on the shaft 15, as mentioned above. The shaft 15 is journalled for axial displacement and rotation in a pair of brackets 38 and 52 on the main supporting frame 31. The shaft 15 is held in a reference axial position by a pair of spring members 56 and 58. The spring 56 is a leaf spring having a head portion 57 which engages the free end of the shaft 15. The helical spring 58 is mounted coaxial with the shaft 13 between the bracket 52 and a washer 59 fixed on the shaft 15.

A pair of gears 60 and 62 are supported in spaced relation near the inner end of the shaft 15. The gear 60 is meshed with the volume controlling potentiometer drive gear 36 when the shaft 13 is in its reference axial position, and the gear 62 is postioned adjacent, but axially spaced from the active fine tuning control pinion 22, so that the pinion 22 and the gear 62 mesh when the control knob assembly 14 is pulled out. A stop member 64 is mounted on the shaft 15 immediately behind the gear 62 and serves to capture a contact supporting arm of a switch 66 mounted on the main supported frame 31.

The knob assembly 14 includes a pair of concentrically mounted knob portions 14*a* and 14*b*. The knob portion 14*a* includes a disc shaped control portion having a recess in the front surface thereof, and a smaller diameter hollow shaft extension. Similarly, the knob portion 14*b* includes a push-button like control part of a dimension to be received in the recess in the front of the knob portion 14*a*. The hollow shaft extension of the knob portion 14*b* fits inside the shaft extension of the outer knob portion 14*a*. FIGURE 5 shows that the configuration of the shaft extension is such as to prevent relative rotation between the two knob portions.

A helical spring 68 which is mounted concentrically with the shaft extension of the knob portion 14*b* urges the two knob portions apart.

A spring member 70 is provided to lock the knob assembly 14 to the shaft 15. The spring 70 has a first bowed portion which urges against the shaped end of the shaft 15 to lock the knob assembly onto the shaft. The end of the spring 70 inside the inner knob portion 14*b* is bent down to dig into the wall of the knob. The other end of the spring 70 is bent around the back end of the knob portion 14*b*, and upwardly to engage the rear end of the outer knob portion 14*a* and thus limit the distance which the front of the inner knob portion 14*b* extends from the outer knob portion 14*a*.

The knob portion 14*a* is mounted close to or against the front panel 11 of the receiver cabinet so that it cannot be axially displaced far enough to cause actuation of the switch 66. Thus when the set operator desires to change the volume or turn the set off by rotation of the knob portion 14*a*, there is substantially no danger of accidentally energizing the tuner drive motor circuit.

Assuming that the set is in the master off position, the outer knob 14*a* is turned about 40° clockwise to place the receiver in a standby-off condition. This rotation of the knob portion 14a rotates the shaft 15, the gears 36, 60 and the cams 34 and 35. The cam 35 releases the master off switch 46 to permit the switch to close. However the cam 34 engages the switch 44 causing this switch to open. The set is now in the standby-off condition. To turn the receiver on, the knob 14a is turned an additional 40° causing the cam 34 to release the switch 44 so that this switch is closed. In the embodiment shown in the drawings, the variable resistor 30 is provided with 300° total rotation stop to stop. 60° of this travel is electrically a dead spot and the remaining 240° is an appropriate tapered resistor. The 60° dead spot is to allow switching by the cams 34 and 35 with no change in the resistance of the volume control resistor 30. There is a gear reduction of 1⅓ to 1 between the gears 60 and 36 so that the set operator will have 80° of rotation on the knob 14a for switching and a normal 320° rotation for volume control.

To tune the receiver, the knob portion 14b is momentarily depressed, as by a finger tip, causing the shaft 15 to be displaced inwardly. The contact arm of the switch 66 which is captured between the gear 62 and the stop 64, is moved into engagement with the other contact arm of the switch to complete the tuner drive motor circuit.

Figures 4, 5, 6:
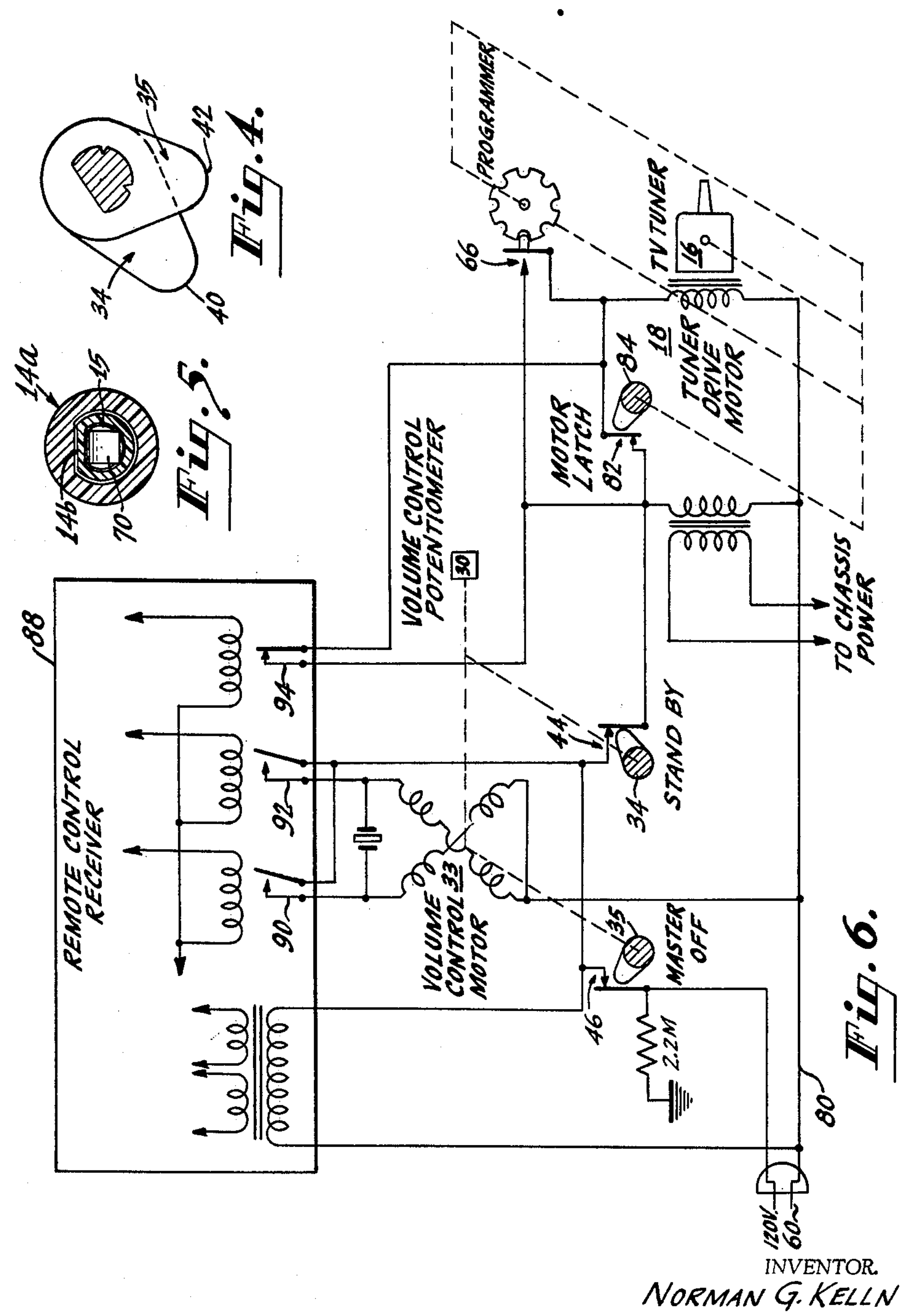
FIGURE 4 is a sectional view of the on-off switch cams, slightly enlarged, taken on the section lines 4—4 of FIGURE 2.
FIGURE 5 is a sectional view of the control knob assembly taken on section lines 5—5 of FIGURE 2.
FIGURE 6 is a schematic circuit diagram of the tuner drive motor circuit.

As shown in the schematic circuit diagram of FIGURE 6, one side of the tuner drive motor 18 is directly connected to a source of power through a conductor 80, and the other side of the motor 18 is connected to the power source through the switch 66 and the standby- and master-off switches 44 and 46. After the motor is initially energized, a motor latch switch 82, connected in parallel with the switch 66 is closed to keep the motor energized even though the knob portion 14a is released, and returned to its reference position by the cantilever spring 56. The motor latch switch 86 is opened by a cam 84 at each detent position of the tuner, so that the motor 18 will drive the tuner to the next detent position before its circuit is opened and it becomes deenergized.

To program the tuner drive motor circuit to bypass certain channel positions, such as those where no signal is received, the knob 140 is held in, until the tuner is driven to the detent position corresponding to the undesired channel as indicated by the dial 13. The knob portion 14a is then pulled out to cause the gear 62 to mesh with one of the pinions 22. The knob portion 14a is then rotated to cause the pinion 22 and its screws 23 to rotate to a limit position where the screws 23 project inwardly a minimum amount. The fine tuning control lever 25 has a finger 86 which projects behind the second contact arm of the switch 66. As the pinion 22 and its screw 23 are rotated to move axially away from the tuner chassis the end 24 of the fine tuning control lever 25 follows the screw, and at the limit position of the screw 23, the finger 86 pushes the second contact arm of the switch 66 into contact with the first contact arm thereby closing the motor circuit. Thus each time the tuner drive motor 18 moves the tuner into the detent position where the pinion 22 and screw 23 have been pre-set to the outer limit position as described, the adjustable pinion 22, screw 23, lever 25, and finger 86 combination, which comprises the programmer shown in FIGURE 4, will cause the switch 66 to close to keep the motor 18 energized. The mechanism may be programmed to bypass as many channels as desired.

The fine tuning of each channel may be optimized by tuning to the desired channel and pulling out on the knob portion 14a to cause the gear 62 to mesh with one of the pinions 22. The knob portion 14a is then rotated to fine tune the receiver for optimum reception. When the knob is released, the spring 58 urges the shaft 15 back to its reference position.

The schematic circuit diagram of FIGURE 6 shows that the various functions of the television receiver may also be controlled by a remote control receiver 88. It will be seen from FIGURE 6 that no power is supplied to either the television receiver chassis or the remote control receiver 88 when the master-off switch 46 is open. However when the standby-off switch is open, the remote control receiver is energized and may be operated to cause power to be applied to the television receiver chassis.

The remote control receiver shown may be responsive to a suitable transmitted signal to control the television receiver volume up or down, or to turn the television receiver to a standby-off position or to a master-off position. To this end, remote control receiver includes a pair of relays having switches 90 and 92 which are included in the control circuit for volume control drive motor 33. A transmitted signal which causes actuation of the relay switch 90 energizes the volume control drive motor 33 in a manner to drive the volume control potentiometer 30 in a direction to turn the television receiver on and to increase the volume. Conversely, a transmitted signal which causes the remote control receiver 88 to actuate the relay switch 92 energizes the volume control drive motor 33 to decrease the receiver volume. If the transmitted signals cause the relay contacts 92 to be energized long enough, the volume control drive motor will cause the cams 34 and 35 sequentially to control the switches 44 and 46 in the same manner as is affected by rotation of the outer knob portion 14a.

The remote control receiver also includes a third relay having a pair of contacts 94 which are effectively connected in parallel with the switch 66. A signal received by the remote control signal 88 which causes the relay contacts 94 to close, energizes the tuner drive motor 18 to tune the receiver in the same manner as the closing of the contacts of the switch 66.

Thus the mechanism of the invention provides control of a large number of receiver functions in a simple and effective manner using only a single "front panel" control element. In addition the mechanism operates in complete compatibility with remote control apparatus without requiring a large number of additional parts.

What is claimed is:

1. A multifunction control apparatus for radio signal receivers comprising:

a motor driven step-by-step tuner having a plurality of station selecting positions, means providing a control circuit for said motor including a switch for causing said motor to drive said tuner from one station selecting position to the next when said switch is actuated, fine tuning control means for said tuner, a volume controlling potentiometer for said receiver having a control member, a main control shaft mounted for rotation and axial movement and biased to a reference axial position, means coupling said main control shaft to said volume controlling potentiometer control member when said main control shaft is in its reference position whereby rotation of said main control shaft causes rotation of said volume controlling potentiometer control member, means mounting said switch for engagement with and actuation by said main control shaft when said shaft is manually moved axially in a first direction to cause said motor to drive said tuner from one channel selecting position to another, and means positioning said fine tuning control means for said tuner for engagement with said main control shaft when said main control shaft is moved axially in a second direction to adjust the fine tuning of said receiver.

2. A multifunction control apparatus for radio signal receivers of the type defined in claim 1 wherein said volume controlling potentiometer control shaft is disengaged from said main control number when said main control shaft is moved axially in said second direction.

3. A multifunction control apparatus for television receivers comprising:

a motor driven step-by-step tuner having a plurality of channel selecting positions, means providing a control circuit for said motor including a switch for causing said motor to drive said tuner from one channel selecting position to the next when said switch is momentarily actuated, a fine tuning reactance element for said tuner, preset fine tuning control means for said tuner including a carrier mounted on the shaft of said tuner, a plurality of adjustable pinions mounted about the periphery of said carrier, a mechanical linkage connected to said fine tuning reactance and positioned to engage one of said pinions whereby adjustment of the position of the pinion engaging said linkage controls said reactance element and the fine tuning of said receiver, a volume controlling potentiometer, a main control shaft mounted for rotation and axial movement in both directions, means for biasing said main control shaft to a reference axial position, a gear mounted on said main control shaft, means coupling said main control shaft to said volume controlling potentiometer when said main control shaft is in its reference position whereby rotation of said main control shaft causes adjustment of said volume controlling potentiometer, means mounting said switch for actuation when said main control shaft is manually moved axially in a first direction to cause said motor to drive said tuner from one channel selecting position to the next, and means positioning said disc so that the pinion that engages said mechanical linkage will engage and mesh with said gear on said main control shaft when said main control shaft is moved axially in a second direction so that rotation of said main control shaft when moved axially to said second direction adjusts the fine tuning of said receiver.

4. A knob assembly for control of apparatus housed in a cabinet and including an axially displaceable and rotatable shaft extending from said cabinet comprising, a first knob portion having a control disc with a recess in the front surface thereof and a hollow shaft extension of smaller diameter then said control disc, said first knob portion adapted to be mounted in close proximity to a cabinet housing apparatus to be controlled, a second knob portion having a control part of a diameter to be received in the recess of the control disc of said first knob portion, and a hollow shaft extension receiver into the shaft extension of said first knob portion, said shaft adapted to be received into the hollow shaft extension of said second knob portion, said hollow shaft extensions being shaped to prevent relative rotation between said first and second knob portions, first spring means between the control disc and control port of said first and second knob portions to urge said second knob portion outwardly with respect to said first knob portion, and second spring means in the hollow shaft extension of said second knob portion to retain said second knob portion on said shaft, said spring means including a portion extending behind the shaft extension of said first knob portion to retain the knob assembly together.

5. A multifunction control apparatus for television receivers mounted in a suitable cabinet comprising;

a motor driven step-by-step tuner having a plurality of channel selecting positions, means providing a control circuit for said motor including a switch for causing said motor to drive said tuner from one channel selecting position to the next when said switch is momentarily manually closed, a fine tuning reactance element for said tuner, preset fine tuning control means for said tuner including a carrier mounted on the shaft of said tuner, a plurality of pinions mounted about the periphery of said carrier, a mechanical linkage connected to said fine tuning reactance and positioned to engage one of said pinions whereby the position of said pinion engaging said linkage controls said fine tuning reactance, a volume controlling potentiometer, a main control shaft mounted for rotation and axial movement, means for biasing said main control shaft to a reference axial position, a gear mounted on said main control shaft, means coupling said main control shaft to said volume controlling potentiometer when said main control shaft is in its reference position whereby rotation of said main control shaft causes adjustment of said volume controlling potentiometer, means mounting said switch for actuation when said main control shaft is moved axially inwardly to cause said motor to drive said tuner from one channel selecting position to the next, means positioning said disc so that the pinion that engages said mechanical linkage will engage and mesh with said gear on said main control shaft when said main control shaft is moved axially outwardly so that rotation of said main control shaft when moved axially outwardly adjusts the fine tuning of said receiver, a control knob assembly comprising inner and outer concentrically mounted knob portions locked for rotation together, means affixing the inner knob portion to one end of said main control shaft so that said knob portions extend outside said receiver cabinet, with said outer knob portion sufficiently close to a wall of said cabinet to prevent inward axial movement thereof from causing actuation of said switch, and spring means between said inner and outer knob portions urging said outer knob portion outwardly with respect to said outer knob portion, so that inwardly directed pressure on said inner knob portion causes axial movement of said mean control shaft to permit actuation of said switch.

6. A multifunction control apparatus for television receivers mounted in a suitable cabinet comprising;

a motor driven step-by-step tuner having a plurality of channel selecting positions, means providing a control circuit for said motor including a switch for causing said motor to drive said tuner from one channel selecting position to the next when said switch is momentarily manually actuated, a fine tuning reactance element for said tuning, preset fine tuning control means for said tuner including a carrier mounted on the shaft of said tuner, a plurality of pinions mounted about the periphery of said carrier, a mechanical linkage connected to said fine tuning reactance and positioned to engage one of said pinions whereby the position of said pinion engaging said linkage controls said fine tuning reactance, a volume controlling potentiometer mechanically coupled for operation by a first gear, a main control shaft mounted for rotation and axial movement, means for biasing said main control shaft to a reference axial position, second and third gears mounted on said main control shaft, said second gear positioned to mesh with said first gear when said main control shaft is in its reference position whereby rotation of said main control shaft causes adjustment of said volume controlling potentiometer, means mounting said switch for actuation when said main control shaft is moved axially inwardly to cause said motor to drive said tuner from one channel selecting position to the next, means positioning said disc so that the pinion that engages said mechanical linkage will engage and mesh with said third gear on said main control shaft when said main control shaft is moved axially outwardly so that rotation of said main control shaft when moved axially outwardly adjusts the fine tuning of said receiver, a control knob assembly comprising inner and outer concentrically mounted knob portions locked for rotation together, means affixing the inner knob portion to one end of said main control shaft so that said knob portions extend outside said receiver cabinet, with said outer knob portion sufficiently close to a wall of said cabinet to prevent inward axial movement thereof from causing actuation of said switch, and spring means between said inner and outer knob portions urging said outer knob portion outwardly with respect to said outer knob portion, so that inwardly directed pressure on said inner knob portion causes axial movement of said mean control shaft to permit actuation of said switch.

References Cited by the Examiner

UNITED STATES PATENTS

| | | | |
|---|---|---|---|
| 2,606,237 | 8/58 | Chase | 200—38 XR |
| 2,886,106 | 5/59 | Gallacher et al. | 200—38 |
| 2,916,617 | 12/59 | Mladek | 74—10.45 |
| 2,981,838 | 4/61 | Poskozim | 74—10.45 XR |
| 3,065,642 | 11/62 | Cappelle et al. | 74—10.27 |
| 3,090,932 | 5/63 | Torrence | 334—51 |

HERMAN KARL SAALBACH, *Primary Examiner.*